Dec. 12, 1961 A. S. KING 3,012,820
AUTOMOTIVE WHEEL BALANCER
Filed Jan. 19, 1959 2 Sheets-Sheet 1
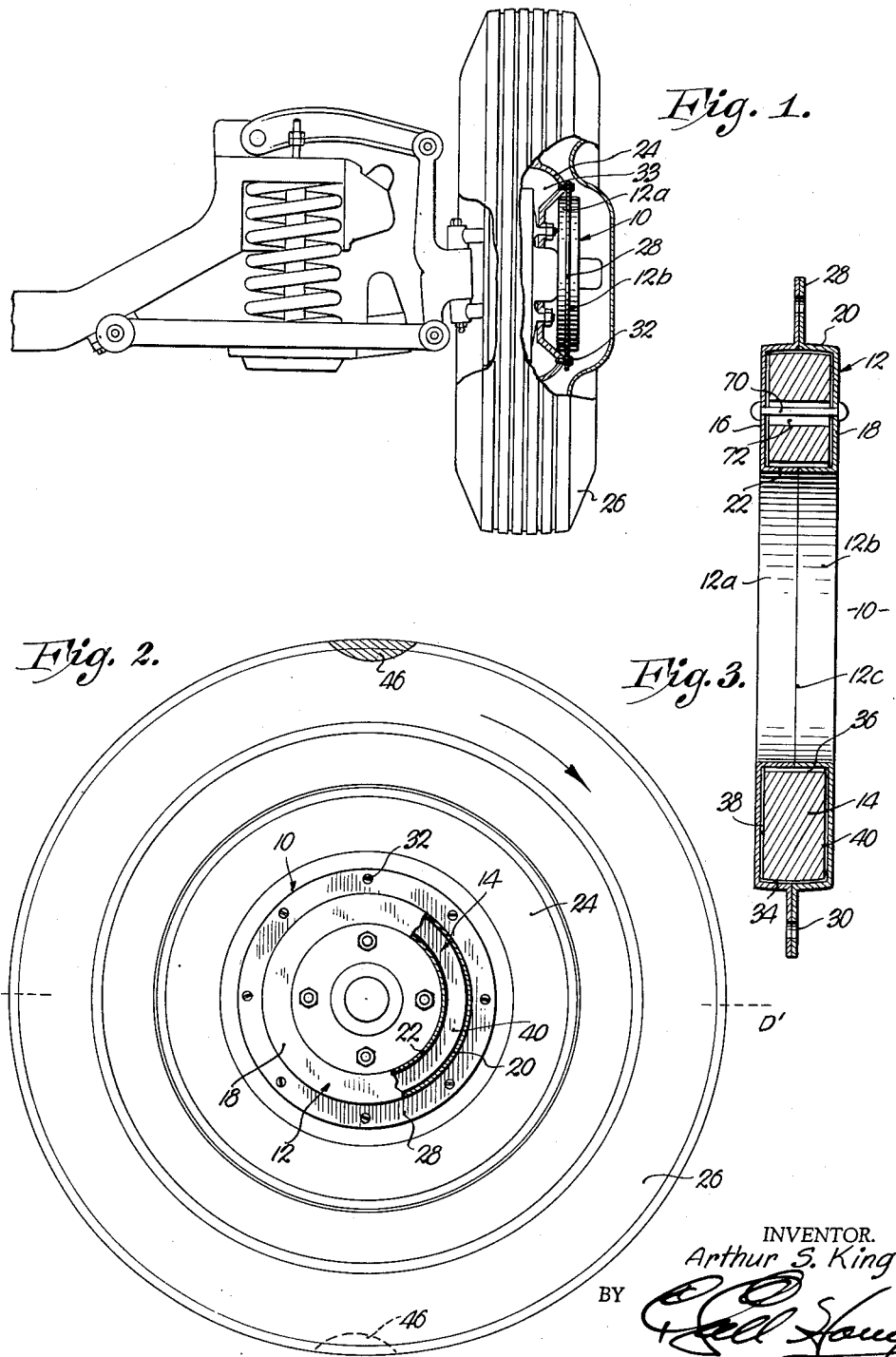
INVENTOR.
Arthur S. King
BY
ATTORNEY.

Dec. 12, 1961  A. S. KING  3,012,820
AUTOMOTIVE WHEEL BALANCER
Filed Jan. 19, 1959  2 Sheets-Sheet 2
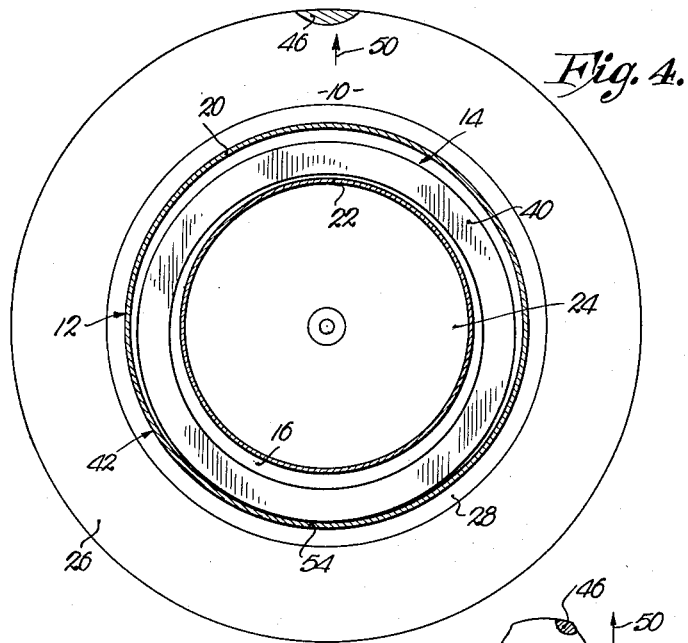
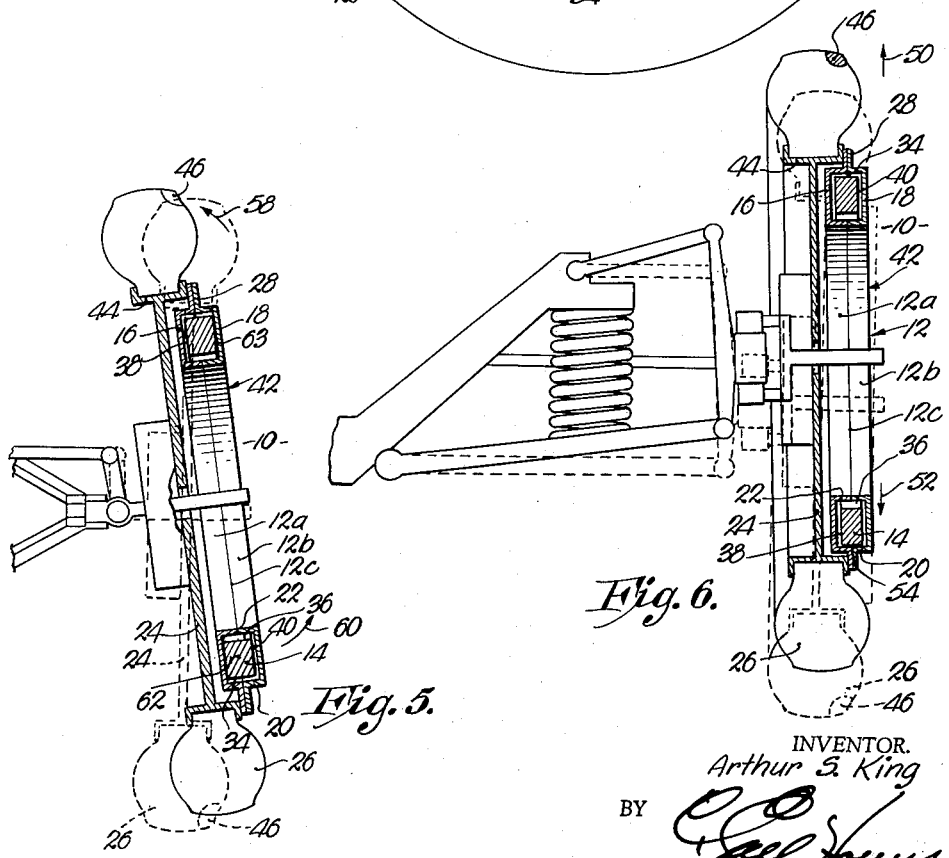
INVENTOR.
Arthur S. King
BY
ATTORNEY.

United States Patent Office 3,012,820
Patented Dec. 12, 1961

3,012,820
AUTOMOTIVE WHEEL BALANCER
Arthur S. King, 6836 Fontana, Prairie Village, Kans.
Filed Jan. 19, 1959, Ser. No. 787,598
4 Claims. (Cl. 301—5)

This invention relates to automobile accessories and more particularly to a wheel attachment for automatically compensating for imbalance in the tire of said wheel.

It is the most important object of the instant invention to provide an automotive wheel balancer that is instantly responsive inertially to tire imbalance, both statically and dynamically regardless of speeds and road conditions.

Another important object of the instant invention is the provision of a wheel-mounted balancer for automotive vehicles that includes as the primary active component thereof, a weight in the nature of a solid ring substantially concentric with the axis of rotation of the wheel upon which the same is mounted, but capable of movement to a position concentric with said axis, and mounted for movement of the wheel relative to the weight to a canted position with respect to the weight so that regardless of the point of imbalance, and regardless of the extent of pounding of the tire against the roadbed as a result of imperfections therein, the said ring weight will continuously, in an ever-changing manner, compensate for the imbalance.

In light of the foregoing, it is by far the primary object of the instant invention to provide a balance weight that is substantially restrained against appreciable movement in any direction by a case within which the ring is housed, to the end that the time element of response, especially at high speeds, does not ineffectuate the desired and necessary results.

In the drawings:

FIG. 1 is a fragmentary, front elevational view of a wheel and axle assembly of an automotive vehicle, parts being broken away to show the wheel balancer embodying the subject matter of the instant invention.

FIG. 2 is a side elevational view of the wheel on an enlarged scale with the hubcap removed, parts being broken away and in section for clearness.

FIG. 3 is a vertical, cross-sectional view still further enlarged, taken through the balancer with the latter entirely removed from the wheel.

FIG. 4 is a schematic elevational view of an automotive wheel showing a balancer of the kind that is adapted for attachment to the rim, the case being in section to show the ring weight in elevation.

FIG. 5 is a schematic, horizontal, cross-sectional view showing in an exaggerated manner an attitude which an automotive wheel is likely to assume and illustrating the operation of the balancer under such conditions; and FIG. 6 is a schematic, vertical, cross-sectional view similar to FIG. 1, illustrating certain other movements of the wheel in response to road conditions and the way in which the balancer responds thereto.

The balancer per se forming the subject matter of the present invention as shown in FIGS. 1–3, is essentially the same as in FIGS. 4–6 differing only in over-all diameter. Hence, the same reference numerals will hereafter be used throughout the description of all of the components in FIGS. 1 to 6 inclusive.

Referring first to FIGS. 1 to 3, wheel balancer 10 consists of but two components, namely, a hollow case 12 and a weight 14. Case 12 is essentially annular, having a pair of spaced, parallel side walls 16 and 18 and a pair of spaced bands 20 and 22. The bands 20 and 22 interconnect the walls 16 and 18 in perpendicular relationship thereto; hence, the case 12 chosen for illustration is transversely rectangular as seen in FIG. 3, and when the same is mounted on an automotive wheel 24, the walls 16 and 18, as well as the annular bands 20 and 22, are concentric to the normally horizontal axis of rotation of the wheel 24 and its tire 26.

Any suitable means may be provided to mount the case 12 on the wheel 24 and, therefore, there is illustrated a continuous rib 28 circumscribing the band 20 and provided with a series of openings 30 adapted to receive fasteners 32 for releasably securing the case 12 to the wheel 24 rather closely adjacent the hub thereof, it being understood of course, that in absence of a need for ready detachment, the rib 28 might well be welded in place. Even more desirably, the balancer 10 should be mounted on the central vertical plane of wheel 24, as for example, whenever possible, in space 33.

The weight 14 housed within the case 12 is in the nature of an annular ring having a pair of concentric edges 34 and 36 and a pair of flat, parallel sides 38 and 40 perpendicular to the edges 34 and 36. Noteworthy is the fact that the thickness of the ring 14 between the sides 38 and 40 thereof is such that it substantially spans the distance between the side walls 16 and 18 and loosely engages the same. However, the distance between the edges 34 and 36 must be substantially less than the distance between bands 20 and 22 so that only the band 20 is loosely engaged by edge 34. Notwithstanding the loose, bearing fit above referred to, ring 14 is shown spaced from the case 12 in an exaggerated manner in the drawings for illustrative purposes.

Ring 14 must be made from a single, essentially inflexible, substantially solid, impliable material whereby it has sufficient mass for instantaneous inertial response to imbalance in the tire 26. Weight 14 may be placed into the case 12 by virtue of the fact that the latter is made in two identical sections 12a and 12b in abutting relationship insofar as band 22 is concerned, at joint 12c, and with the two parts of rib 28 in flat interengagement.

The balancer 42 shown in FIGS. 4 to 6 inclusive, differs only from the balancer 10 in that it has a larger diameter for attachment of the rib 28 thereof to rim 44 of wheel 24.

A characteristic or common type of imbalance in tire 26 is depicted schematically in FIGS. 2, 4, 5 and 6 of the drawings wherein the numeral 46 designates a point of excess weight. As is well known, the excess weight 46 produces an undesirable vibration as the tire 26 constantly pounds the roadbed with unequal forces during each revolution. Centrifugal forces manifestly tend to cause tangential expansion of the tire outwardly away from the rim and since such tangential tendencies are greater at the zone of excess weight 46, the undesired vibration and excessive wear at that point in the tire, takes place each time such zone comes into contact with the roadbed. With these factors in mind it can now be appreciated that the outward force depicted by the arrow 50 in FIGS. 4 and 6 incident to the presence of excess wight 46, produce a diametrically opposed, equal reactive force in ring 14 in the opposite direction as shown by the arrow 52 in FIGS. 4 and 6.

In response to the reactive forces shown by the arrow 52, the weight 14, by virtue of its inherent mass and consequent inertia, will instantly shift within the case 12 to a position eccentric to the axis of rotation of the wheel 24 bearing tightly against the outer band 20 at point 54.

It is now apparent that the diameter of edge 36 must be appreciably greater than that of band 22 so that the contact is always between edge 34 and band 20. Otherwise, the added weight of ring 14 would not be opposite the excess weight zone 46.

It is to be realized that the centrifugal forces depicted by arrow 50 are ever changing as the wheel 24 rotates since gravity enters into the calculations as the excess weight 46 rotates downwardly and, also in an opposite manner when the excess weight 46 moves upwardly. Still further, the centrifugal forces are diminished progressively as the zone 46 of tire 26 moves into engagement with the roadbed.

By way of further illustration, in FIG. 2 of the drawings, the substantially horizontal axis of the wheel and tire assembly is shown by the line D—D'. It can be visualized that even in an otherwise perfectly balanced tire, uneven road terrain will cause the entire axis D—D' to vibrate vertically. In compensation therefor, the weight 14 will likewise oscillate vertically, but in the opposite directions in response to the reactive forces.

During rotation of the wheel, when excess weight 46 is disposed as shown in full lines, the ring 14 bears downwardly against the band 20 and its entire weight is carried by that half of the wheel and tire below line D—D'. As the excess weight 46 moves downwardly, transcrosses line D—D' and arrives at the point shown by dotted lines in FIG. 2, the ring 14 progressively, but quickly changes positions until its force component is again vertical, but in an upward direction. Its entire weight is then one on the upper half of the wheel above line D—D'. By the same token, as the excess weight passes line D—D', moving downwardly, the force component of ring 14 will be substantially horizontal toward the designation D, and when excess weight 46 crosses line D—D', moving upwardly, the force component of ring 14 will be substantially horizontal in the opposite direction toward the designation D'.

In FIG. 5 of the drawings, the excess weight area 46 is such as to produce a lateral component substantially in the direction of arrow 58, and the equal and opposite reactive force is, therefore, obviously in the direction of arrow 60.

Another facet now comes into being, commonly referred to as "wobble," because of the fact that excess weight 46 is all on one side (outwardly) of the central vertical plane of the tire, such plane being understood to be that which is normal to the axis of rotation.

Hence, the immediate response is such as to cause a canted relationship of the weight 14 to the plane of the wheel 24 or, with respect to the parallel side walls 16 and 18. Note in FIG. 5, therefore, showing in an exaggerated manner, the way in which the sides 38 and 40 bear tightly against the inner faces of walls 16 and 18 at points 62 and 63 respectively.

The response in this instance is not a movement of the ring 14 to a canted position. Instead, ring 14, during rotation, tends, gyroscopically, to remain in, or preserve a constant vertical plane of rotation. On account of the resistance it offers to a change in the direction of its axis when rotating, ring 14 thereby operates to resist the tendency of wheel 24 to wobble out of a vertical plane.

When wall 16 moves against side 38 at point 62 and wall 18 moves against side 40 at point 63, the ring 14 resists the tendency of wheel 24 to cant laterally as depicted by arrow 58 as a result of the action of excess weight 46.

It is now to be pointed out and emphasized, that the various relative movements of the weight 14 and the case 12, must be slight; otherwise, the out-of-balance forces would not be compensated quickly enough to accomplish any good results. In other words, if the construction were such as to permit appreciable movement in the ring 14, it would lag behind the undesirable forces which the ring 14 is designed to balance. The net result would then be deleterious because of increased, rather than decreased vibration.

Nonetheless, in spite of the minimum over-all movement of the ring 14, its mass or inherent weight is, for all practical purposes, quite adequate to compensate for ordinary imbalance. This is particularly true with respect to excess weight zones, and actual tests have proved that the balancer hereinabove described will operate as above explained to virtually remove all vibration even under conditions of unusual imbalance.

Materials should be chosen carefully from metals, plastics or ceramics to account for temperature changes and, it may be desirable to provide a lubricant in the case 12 having proper viscosity under all driving and temperature conditions.

Any suitable means may be provided to prevent rotation of weight 14 with respect to case 12. For example, as shown in FIG. 3 only, one or more cross pins 70 may be attached to case 12, interconnecting walls 16 and 18 and traversing weight 14. Opening or slot 72 in weight 14, which receives pin 70, should be appreciably and sufficiently larger than pin 70 to permit the lateral and/or radial movements of weight 14 relative to case 12, as above described, without binding or other deleterious effects.

Noteworthy also, as best seen in FIG. 3, is the fact that the outermost, annular edge 34 of weight 14 is transversely arcuate and that the band 20 of case 12 which surrounds weight 14 has the innermost concave face thereof formed complementally to the convex edge 34. The radius is half the outer diameter of weight 14 and half the inside diameter of band 20. Stated another way, weight 14 and band preferably constitute central segments of true spheres. Such construction allows proper lateral shifting of weight 14 as above described without undue interference when edge 34 is against band 20.

Having thus described the invention what is claimed as new and desired to be secured by Letters Patent is:

1. In an automotive vehicle having a wheel provided with a road-engaging tire, a balancer comprising a hollow case provided with a pair of spaced, parallel side walls and an annular band interconnecting the walls in perpendicular relationship thereto; means rigidly attaching the case to said wheel with said band concentric with the substantially horizontal axis of rotation of the wheel; a single, essentially inflexible weight of substantially solid, impliable material within said case having sufficient mass for inertial response instantly to imbalance in said tire during rotation, at all speeds and at all road and driving conditions, said weight comprising a ring substantially spanning the distance between said walls, said ring having an edge radially spaced from the axis of revolution thereof loosely engaging said band and a pair of opposed sides perpendicular to said edge and loosely engaging the walls, adapting the ring to assume an everchanging relationship to said axis of rotation, either eccentric to the band or canted with respect to the walls, depending on the nature of said imbalance, whereby to continuously compensate for the imbalance; and means coupled with said weight and secured to the case for precluding rotation of said weight relative to said case while permitting the edge and the sides of said weight to move into and out of engagement with the band and side walls respectively of said case.

2. In an automotive vehicle having a wheel provided with a road-engaging tire, a balancer comprising a hollow case provided with a pair of spaced, parallel side walls and a pair of spaced, concentric, annular bands interconnecting the walls in perpendicular relationship thereto; means rigidly attaching the case to said wheel with said bands concentric with the substantially horizontal axis of rotation of the wheel; an essentially inflexible weight housed within said case and having sufficient mass for inertial response instantly to imbalance in said tire during rotation, at all speeds and at all road and driving conditions, said weight comprising a ring substantially spanning the distance between said walls, said ring having an outermost annular edge loosely engaging the outermost band and a pair of opposed sides perpendicular to said edge and loosely engaging the walls, adapting the ring to assume an ever-changing relationship to said axis of rotation, either eccentric to the outermost band or canted with respect to the walls, depending on the nature of said imbalance, whereby to continuously compensate for the imbalance; and means coupled with said weight and secured to the case for precluding rotation of said weight relative to said case while permitting the edge and the sides of said weight to move into and out of engagement with the outermost band and side walls respectively of said case.

3. In an automotive vehicle having a wheel provided with a rim having a road-engaging tire surrounding the same, a balancer comprising a hollow case provided with a pair of spaced, parallel side walls and an annular band interconnecting the walls in perpendicular relationship thereto; a rib surrounding the case and integral therewith; means rigidly attaching the rib to said rim with said band concentric with the substantially horizontal axis of rotation of the wheel; an essentially inflexible weight within said case and having sufficient mass for inertial response instantly to imbalance in said tire during rotation, at all speeds and at all road and driving conditions, said weight comprising a ring substantially spanning the distance between said walls, said ring having an edge radially spaced from the axis of revolution thereof loosely engaging said band and a pair of opposed sides perpendicular to said edge and loosely engaging the walls, adapting the ring to assume an ever-changing relationship to said axis of rotation, either eccentric to the band or canted with respect to the walls, depending on the nature of said imbalance, whereby to continuously compensate for the imbalance; and means coupled with said weight and secured to the case for precluding rotation of said weight relative to said case while permitting the edge and the sides of said weight to move into and out of engagement with the band and side walls respectively of said case.

4. In an automotive vehicle having a wheel provided with a rim having a road-engaging tire surrounding the same, a balancer comprising a hollow case provided with a pair of spaced, parallel side walls and a pair of spaced, concentric, annular bands interconnecting the walls in perpendicular relationship thereto; a rib surrounding the case and integral therewith; means rigidly attaching the rib to said rim with said bands concentric with the substantially horizontal axis of rotation of the wheel, the walls spanning the distance between the bands and being concentric to said axis of rotation; a single, essentially inflexible weight of substantially solid, impliable, metallic material housed within said case and having sufficient mass for inertal response instantly to imbalance in said tire during rotation, at all speeds and at all road and driving conditions, said weight comprising a ring substantially spanning the distance between said walls, said ring having a pair of concentric, annular edges, the outer edge loosely engaging the outer band, the inner edge being always spaced from the inner band, and a pair of opposed sides perpendicular to said edges and loosely engaging the walls, adapting the ring to assume an ever-changing relationship to said axis of rotation, either eccentric to the bands or canted with respect to the walls, depending on the nature of said imbalance, whereby to continuously compensate for the imbalance; and pin means coupled with said weight and secured to said case for precluding rotation of said weight relative to said case while permitting the edges and the sides of said weight to move into and out of engagement with the bands and side walls respectively of said case.

References Cited in the file of this patent
UNITED STATES PATENTS

| | | |
|---|---|---|
| 1,183,745 | Ledyard | May 16, 1916 |
| 2,092,571 | Cole | Sept. 7, 1937 |
| 2,573,398 | Butenkoff | Oct. 30, 1951 |
| 2,719,756 | Duke | Oct. 4, 1955 |
| 2,724,983 | O'Connor | Nov. 29, 1955 |
| 2,901,290 | Loofbourrow | Aug. 25, 1959 |

FOREIGN PATENTS

| | | |
|---|---|---|
| 508,513 | Great Britain | July 3, 1939 |
| 446,119 | Italy | Mar. 11, 1949 |
| 650,891 | Great Britain | Mar. 7, 1951 |